ial No.: US 11,159,388 B2
(45) Date of Patent: Oct. 26, 2021

(54) METHOD FOR DETECTING AND DETERMINING A FAILURE PROBABILITY OF A RADIO NETWORK AND CENTRAL COMPUTER

(71) Applicant: Audi AG, Ingolstadt (DE)

(72) Inventors: Tim Gilsdorf, Talheim (DE); Bertram Münch, Neckarsulm (DE); Christian Wolf, Untergruppenbach (DE); Michael Häffner, Lauffen (DE)

(73) Assignee: Audi AG, Ingolstadt (DE)

( * ) Notice: Subject to any disclaimer, the term of this patent is extended or adjusted under 35 U.S.C. 154(b) by 192 days.

(21) Appl. No.: 16/606,332

(22) PCT Filed: Apr. 17, 2018

(86) PCT No.: PCT/EP2018/059701
§ 371 (c)(1),
(2) Date: Oct. 18, 2019

(87) PCT Pub. No.: WO2018/192889
PCT Pub. Date: Oct. 25, 2018

(65) Prior Publication Data
US 2020/0351170 A1  Nov. 5, 2020

(30) Foreign Application Priority Data

Apr. 20, 2017 (DE) ...................... 10 2017 206 631.8

(51) Int. Cl.
*H04L 12/24* (2006.01)
*G06N 7/00* (2006.01)
(Continued)

(52) U.S. Cl.
CPC ........... *H04L 41/147* (2013.01); *G06N 7/005* (2013.01); *H04L 41/0686* (2013.01);
(Continued)

(58) Field of Classification Search
CPC .. H04L 41/147; H04L 41/0686; H04L 41/142; H04L 41/145; H04L 43/16; G06N 7/005; H04W 84/12
See application file for complete search history.

(56) References Cited

U.S. PATENT DOCUMENTS 7,451,210 B2 * 11/2008 Gupta ................... G06F 11/008
709/223
8,145,745 B1 * 3/2012 Ge ...................... H04L 43/0882
709/224

(Continued)

FOREIGN PATENT DOCUMENTS

DE 10 2006 016 800 A1 8/2007
DE 10 2015 204 246 A1 9/2016
WO WO 2007/048738 A1 5/2007

OTHER PUBLICATIONS

International Search Report and Written Opinion of the International Searching Authority directed to related International Patent Application No. PCT/EP2018/059701, dated Jun. 19, 2018, with attached certified English-language translation; 14 pages.

(Continued)

*Primary Examiner* — Hassan Kizou
*Assistant Examiner* — Hector Reyes
(74) *Attorney, Agent, or Firm* — Sterne, Kessler, Goldstein & Fox P.L.L.C.

(57) ABSTRACT

The present application relates to a method for detecting and determining a failure probability (pA) of a radio network. The method is characterized in that devices of the radio network cyclically transmit operating parameters to a central computer wherein each transmitted operating parameter comprises an operating value of the respective device and a detection time point (t) of the operating value. All transmitted parameters and values can be viewed at any time by accessing the central computer. The central computer cycli- (Continued)

cally stores the operating values of all operating parameters detected within a predefined time interval (T) as the respective operating constellation and checks the radio network for a failure (A). The central computer cyclically creates a model based on the stored operating constellations and failures (A), which assigns a failure probability (pA) to each possible operating constellation.

12 Claims, 3 Drawing Sheets

(51) Int. Cl.
*H04L 12/26* (2006.01)
*H04W 84/12* (2009.01)

(52) U.S. Cl.
CPC .......... *H04L 41/142* (2013.01); *H04L 41/145* (2013.01); *H04L 43/16* (2013.01); *H04W 84/12* (2013.01)

(56) References Cited

U.S. PATENT DOCUMENTS

| | | | |
|---|---|---|---|
| 9,531,522 B2 | 12/2016 | El Gamal et al. | |
| 9,846,839 B2* | 12/2017 | Nasle | G06N 5/048 |
| 9,900,790 B1* | 2/2018 | Sheen | H04L 41/5009 |
| 10,491,754 B2* | 11/2019 | Yermakov | H04L 41/16 |
| 2001/0047416 A1 | 11/2001 | Yoshimura | |
| 2002/0168993 A1 | 11/2002 | Choi et al. | |
| 2005/0039086 A1* | 2/2005 | Krishnamurthy | H04L 41/147 714/57 |
| 2005/0114739 A1* | 5/2005 | Gupta | G06F 11/3058 714/39 |
| 2007/0192065 A1* | 8/2007 | Riggs | H04L 41/147 702/189 |
| 2015/0148040 A1 | 5/2015 | Ehrlich et al. | |
| 2016/0057639 A1 | 2/2016 | Smith | |
| 2018/0049138 A1 | 2/2018 | Fontana et al. | |
| 2018/0113773 A1* | 4/2018 | Krishnan | G06F 11/008 |

OTHER PUBLICATIONS

International Preliminary Report on Patentability directed to related International Patent Application No. PCT/EP2018/059701, dated Oct. 22, 2019, with attached English-language translation; 12 pages.

* cited by examiner

METHOD FOR DETECTING AND DETERMINING A FAILURE PROBABILITY OF A RADIO NETWORK AND CENTRAL COMPUTER

TECHNICAL FIELD

The present application relates to a method for detecting and determining a failure probability of a radio network and a central computer configured to carry out the method. The radio network may be a Wireless Local Area Network (WLAN).

BACKGROUND

Large-scale radio network infrastructures, which include multiple access points and for which a plurality of terminals is provided, require a special configuration and monitoring in terms of their reliability. Errors in the configuration or overloading of the network infrastructure may lead to functional impairments or a complete failure of the radio network. In particular, in industrial plants where components communicate via radio networks, failures of a radio network may lead to an interruption of the production process, which may lead to high economic damage.

In order to ensure the reliability of radio networks, methods and devices have been developed that can optimize the planning and control of a radio network infrastructure.

DE 10 2006 016 800 A1 describes a metrologically assisted iterative method for the purpose of constructing an optimal radio network in a building using a 3D model of this building and empirical models for determining the relevant performance parameters. As part of the process, the arrangement of WLAN access points in a building is optimized by means of a 3D model and experimentally collected data. In one development of the method, the experimental data must be repeated and recorded iteratively in real data traffic.

US 2002/0168993 A1 describes a path loss estimation for the power, control and connection adjustment of an IEEE 802.11h WLAN. The method measures the path loss between a receiver and a transmitter and makes a power and connection adjustment for the receiver based on the results of that measurement.

DE 10 2015 204 246 A1 describes a device and a method for the power adjustment of a WLAN network. Here, the transmission power of a WLAN module is adjusted such that the signal strength received at a reference WLAN module is smaller than a predefined threshold value.

US 2016/0057639 A1 describes a method for the dynamic provision of real-time services for a mobile device in a decentralized radio network. Here, a reception area and a probability for the occurrence of a network error in the reception area are predicted.

U.S. Pat. No. 9,531,522 B2 describes a method for a predictive resource allocation in a network. Here, an inquiry from a device in the network is assigned a time window for answering the inquiry.

US 2015/0148040 A1 describes an anomaly correlation mechanism for analyzing handoff operations in a communication network. Time series, which concern errors in handover processes between radio cells, are evaluated.

The references cited above relate to methods which describe a configuration of a radio network or facilitate power adjustments to ensure radio network operations. In a radio network with a plurality of subscribers, operations may not be maintained by means of an adaptation of transmission powers alone. In such cases, it is necessary to be able to take suitable measures against an imminent failure in order to be able to ensure the operation of the radio network.

BRIEF DESCRIPTION OF DRAWINGS/FIGURES

DETAILED DESCRIPTION

Figure 1:
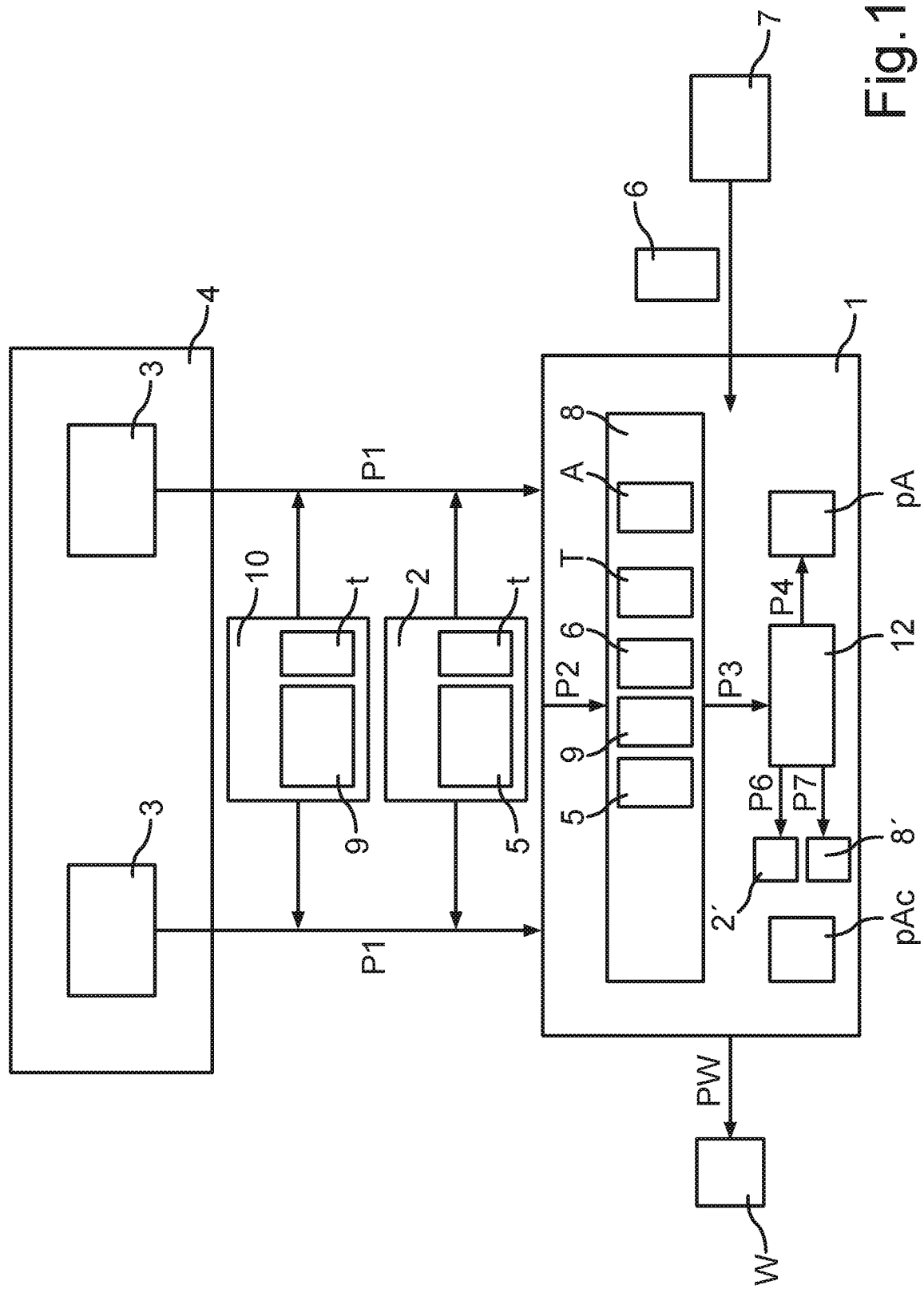
FIG. 1 illustrates a schematic representation of a central computer, in accordance with some embodiments.

It is an object of the present application to provide a method which makes it possible to determine the utilization of a radio network.

The object is achieved by the subject matters of the independent claims. Advantageous developments of the present application are disclosed by the features of the dependent claims, the following description, and the drawing.

In some embodiments, a method for detecting and determining a failure probability of a radio network is disclosed. The devices of the radio network transmit cyclical operating parameters to a central computer, wherein each transmitted operating parameter includes an operating value of the respective device and a detection time of the operating value. The central computer cyclically stores the operating values of all operating parameters detected within a respective predefined time interval as the respective operating constellation. The central computer cyclically creates a model on the basis of the stored operating constellations, which assigns a failure probability to every possible operating constellation. By way of non-limiting example, the devices of the radio network regularly transmit operating parameters, which each include an operating value and a detection time, to a central computer. The values recorded within a certain time interval are summarized and stored as a respective operating constellation. These can be viewed at any time by accessing the central computer. The central computer checks the radio network for the presence of a failure in the specific time interval. The stored operational constellations and detected failures are used by the central computer to create a model which assigns a failure probability to each possible operational constellation. A probability value may be obtained, for example, by counting how many times a failure occurred in a given operating constellation. The ratio between counted failures and the total number of observations of this operational constellation provides a probability. A failure may be, for example, that at least one of the devices was disconnected or cut off from the radio network.

By way of non-limiting example, a radio network may be a WLAN network. Devices of the radio network may also be intermediary devices or infrastructure devices, which may include, for example, access points and/or routers and/or repeaters, and terminals such as devices with a radio module that are compatible with the radio network.

In some embodiments, operating parameters may be parameters that describe a state of a device and pertain, for example, to its connection to the radio network. An operating parameter includes an operating value and a detection time of the operating value. An operating parameter may include, for example, a transmission and/or reception power, the number of other devices of the radio network detected by the respective device, a transmission frequency, a number of transmitted, corrected, erroneous or received packets, error messages or a signal quality. The operating parameters that relate to the device itself may include, for example, the power consumption, an operating state, a system version or the temperature or its memory load or a geographical position. A central computer may be a server or computer with at least one microprocessor. A respective operating constellation is a compilation of all operating parameters that were recorded in accordance with their detection time in a respective predefined time interval and is to be understood as a snapshot of the radio network in the respective time interval. A time interval may be, for example, a period between 1 minute and 1 hour. A failure of the radio network is a state of the radio network in which it does not or no longer fulfills a predetermined functionality to a predetermined extent. This does not only refer to a complete failure of all devices, but, for example, a state in which, for example, a single device cannot interact with the radio network to a required extent. For example, a model may be a mathematical model based on empirical values or which is a simulation. The model may be designed such that it provides a failure probability for an operating constellation. With each additional stored operational constellation and information on a failure, the model can be adjusted with each cycle. In other words, it is iteratively improved. The model cannot only calculate the failure probability of a real operating constellation but it can also provide at least one operating parameter and/or a failure probability for a changed operating constellation. Thus, it may be possible that, in the context of an improvement measure, the resulting received power can be predicted when expanding the radio network to a repeater at a specific geographic position. Thus, a failure probability can also be predicted or extrapolated for a planned operating constellation.

In some embodiments, the central computer cyclically calculates a probability of an occurrence of a failure for each newly stored operating constellation. By way of non-limiting example, the central computer uses the model to calculate the currently existing failure probability after each successful transmission of an operating constellation. This results in the advantage that a trend of an increasing failure probability of the radio network can be detected.

In some embodiments, the current failure probability is compared with a predetermined warning threshold, and if the warning threshold is exceeded, a warning signal is generated. By way of non-limiting example, a warning threshold can be determined with regard to the failure probability and a warning signal issued when it is exceeded. For example, in the case of a calculated failure probability above the warning threshold, e.g., 2%, a warning signal in the form of an e-mail can be transmitted or sent out by the central computer. This has the advantage that a countermeasure can be initiated if the failure probability becomes too great, i.e., above the warning threshold.

A difference is provided for each current operating parameter, which, according to the probability distribution, would cause the warning threshold value to be exceeded with the other operating values remaining the same. By way of non-limiting example, the central computer determines the difference for a current operating value of an operating parameter, which would cause the warning threshold value to be exceeded. This has the advantage that it is obvious to a user how large individual reserves are for the operating parameters or to which values they must be adjusted to reduce the failure probability. This makes it possible to find critical operating parameters.

In some embodiments, a failure comprises at least one occurrence of an indication value of at least one indication parameter in a predetermined value range. An indication parameter may include an operating parameter whose operating value provides information about the functioning of the radio network. This may include, for example, the received power and/or the number of faulty packets received. The predetermined value range may be chosen such that a proper functioning of the radio network is no longer ensured if a respective indication parameter has an indication value in this value range. A failure may be defined, for example, as falling below a certain receiving power of a device.

In some embodiments, the model for the assignment of a failure probability is generated by a correlation of the operating constellations with the respectively occurring failures by means of a pattern recognition algorithm. By way of non-limiting example, the operating constellations and the failures of the radio network are used as input values of a pattern recognition algorithm, which creates a model from that. A pattern recognition algorithm may be a program code of a program for the evaluation of large data volumes (big data tool). In particular, methods of machine learning or artificial neural networks may be used. This has the advantage that no manual definition of causal relationships must be made, which, due to the complexity and the amount of the data volume, cannot be detected by a user. The algorithm can thus create a model for the failure probability by recognizing patterns between operating constellations and failures.

In some embodiments, the central computer determines a predicted operating constellation by means of extrapolation methods and that it generates a warning signal when the warning threshold value is exceeded in the predicted operating constellation. By way of non-limiting example, the stored operating constellations are used to generate a projection or a trend for an operating constellation at a future time, and a warning signal is generated when a failure probability is calculated for the predicted operating constellation that exceeds the warning threshold value. By way of non-limiting example, a received power that has constantly decreased over a period of hours may be linearly extrapolated and a warning signal generated if the extrapolation for the next hour predicts an operating constellation with a failure probability above the warning threshold. In this way, adjustments can be made to the radio network in a timely fashion.

In some embodiments, boundary parameters outside the radio network are determined for a specific period of time and allocated to the operating constellation and that the central computer takes the boundary parameters into account during the creation of the model. By way of non-limiting example, boundary parameters outside the radio network may be associated in a particular period of time in addition to a failure and an operating constellation. Radio network external boundary parameters may include values which describe a boundary condition under which the radio network is operated. These may include, for example, voltage fluctuations in a supply voltage or maintenance work. This has the advantage that it is also possible to detect boundary conditions which are not directly related to the radio network but may have an impact on the failure probability. It is possible, for example, that a failure can be attributed to maintenance performed on a device. By means of the boundary parameter, the model can associate the failure with the same and not with the operating constellation of the time interval.

In some embodiments, a central computer, which is configured to carry out one of the methods is disclosed.

Other embodiments of the central computer may have features such as those previously described in connection with the various embodiments of the method as described herein. For this reason, the corresponding embodiments of the central computer are not described again here.

Exemplary embodiments of the present application are described below.

The embodiments described below are preferred embodiments of the present application. In the embodiments, the components of the embodiments that are described each constitute individual features to be considered in isolation and in a combination that is different from the combination described. In addition, the embodiments described may also be supplemented by further features of the present application, which have already been described.

In the drawings, functionally identical elements are denoted with the same reference signs.

FIG. 1 illustrates a schematic representation of a central computer, in accordance with some embodiments. FIG. 1 shows a central computer 1 to which cyclical operating parameters 2 of devices 3 of a radio network 4 are transmitted. Operating parameters 2 may include operating values 5 and the respective detection times t of the operating values 5. A radio network 4 may be, for example, a GSM radio network or a WLAN radio network. The devices 3 may be, for example, access points or repeaters, which act as infrastructure devices and terminal devices, such as microcomputers or microcontrollers, which are connected to the radio network via a suitable radio module. Operating parameters 2 may be data, which may relate to a respective device 3 itself, or the interaction of the device 3 with the radio network 4. These may include, for example, the received power and/or the transmission power. The central computer 1 may also receive boundary parameters 6, which were detected by an external sensor unit 7. The central computer may allocate the operating parameters 2 and boundary parameters 6 detected in a time interval T to a respective operating constellation 8. Thus, an operating constellation 8 represents a snapshot of the radio network 4 in a specific time interval T. Information about the presence of a failure A is associated to such a time interval T as well. A failure A may include, for example, an occurrence of an indication value 9 of an indication parameter 10 in a predetermined value range 11. An indication parameter 10 may be an operating parameter 2, which must have specific values for the proper functioning of the radio network 4. The central computer 1 may be set up to use the stored data to create a model 12, which assigns a failure probability pA to a specific operating constellation 8.

Figure 2:
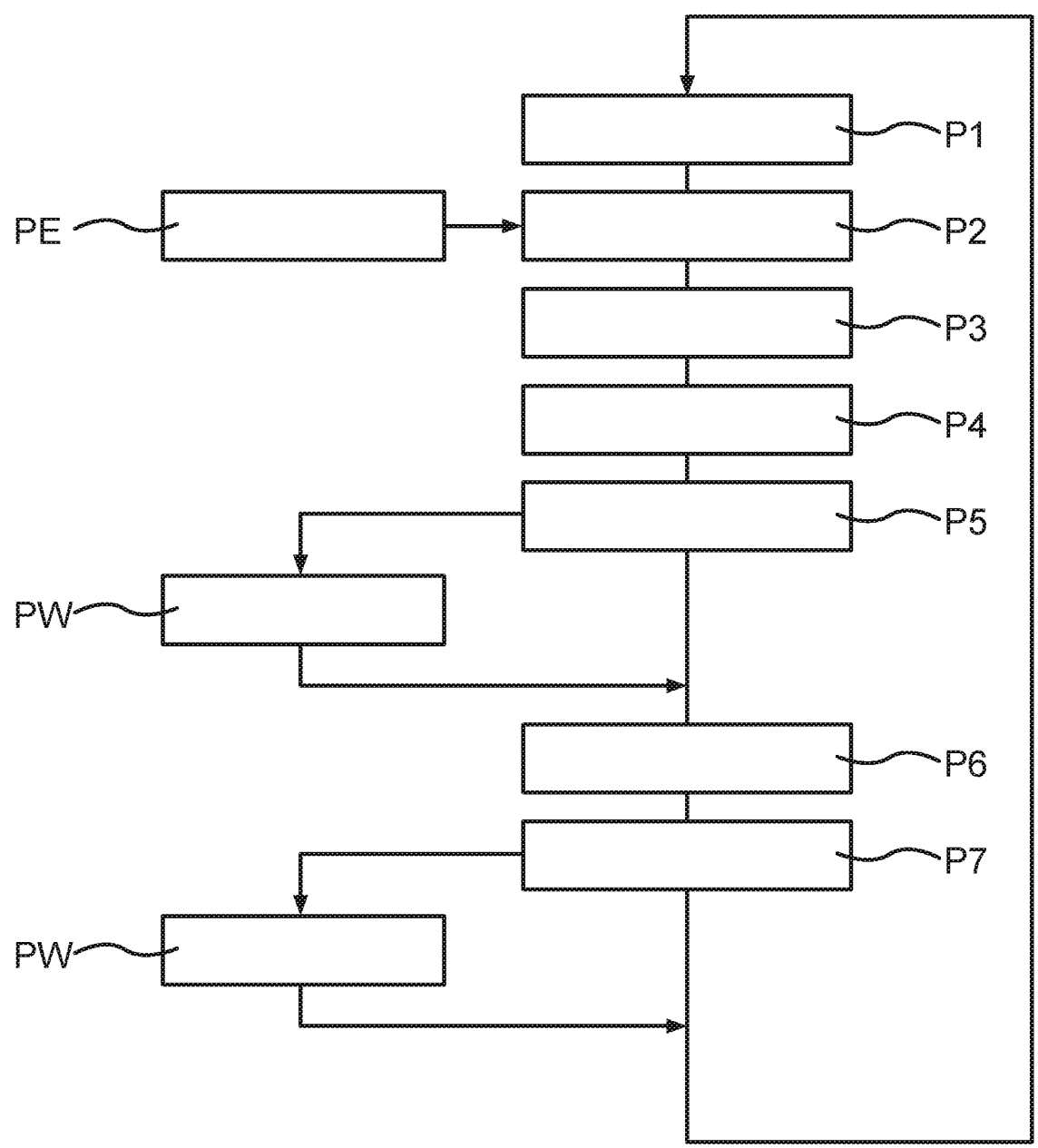
FIG. 2 illustrates a process flow as it can be performed by the central computer, in accordance with some embodiments.

FIG. 2 illustrates a process flow as it can be performed by the central computer, in accordance with some embodiments. FIG. 2 shows a possible sequence of a method according to an embodiment for determining a failure probability pA of a radio network 4. In a step P1, devices 3 of the radio network 4 cyclically transmit operating parameters 2 to the central computer 1. In step P2, the central computer 1 stores the operating values 5 of all operating parameters 2 that were detected in a predefined time interval T as the respective operating constellation 8 and checks the radio network 4 for the presence of a failure A. The central computer 1 can, on the basis of the stored operating constellations 8, create a model 12, which assigns a failure probability pA to each possible operating constellation 8 P3. The central computer 1 can be set up to automatically calculate the failure probability pA for each new stored operating constellation 8 P4. It may be that a warning threshold pAc is defined with regard to the failure probability pA. Provisions can be made for the central computer 1 to compare the calculated failure probability pA for a newly stored operating constellation 8 with the warning threshold value pAc P5 and for a warning signal WPW to exceed the warning threshold value pAc. It may be that the central computer 1 outputs a difference 2' for each current operating parameter 2, which would lead to the warning threshold pAc being exceeded with the other operating values 5 of other operating parameters 2 remaining constant P6. It may be that the central computer 1 determines a predicted operating constellation 8' by means of an extrapolation method P7 and generates a warning signal W if the failure probability pAc for the predicted operating constellation 8' is exceeded PW.

Figure 3:
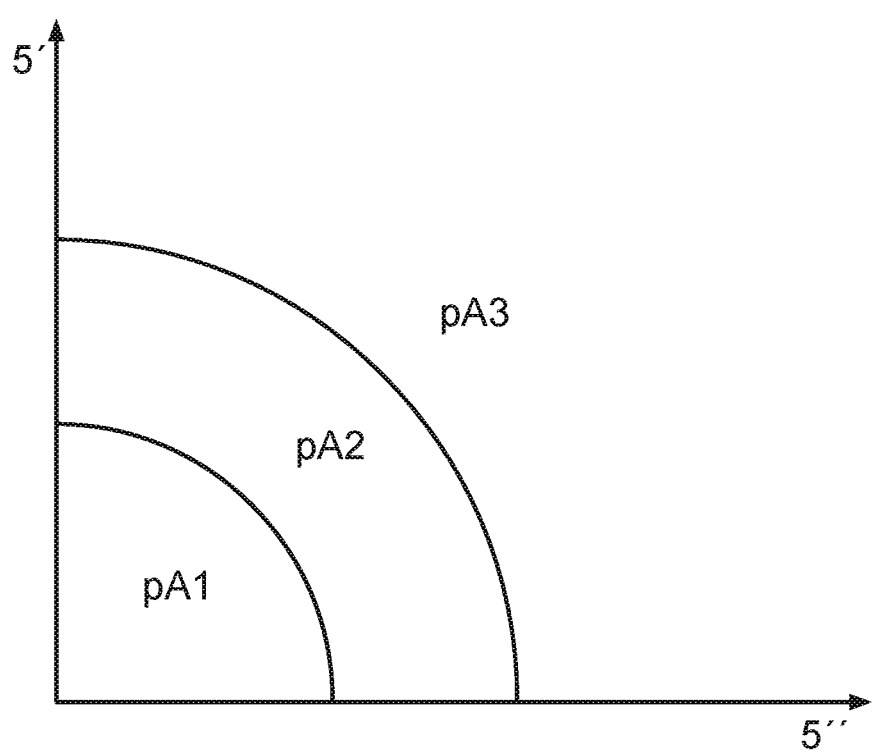
FIG. 3 illustrates a model for determining a failure probability, in accordance with some embodiments.

FIG. 3 illustrates a model for determining a failure probability, in accordance with some embodiments. FIG. 3 shows a possible model for determining a failure probability of a radio network. It shows three areas pA1, pA2, pA3, which describe three different failure probabilities as a function of two operating values 5', 5".

Overall, the examples show a method for monitoring a failure probability of a radio network.

The invention claimed is:

1. A method, comprising:
   receiving, at a central computer, a plurality of operating parameters from a plurality of devices of a radio access network via the radio access network;
   checking, by the central computer, at a configurable time interval for a failure of the radio access network;
   storing, at the central computer, operating values corresponding to the plurality of operating parameters detected within the configurable time interval as a group and the failure of the radio access network detected within the configurable time interval;
   generating, by the central computer, a model based on a plurality of groups corresponding to the stored operating values and the stored failures of the radio access network to assign a failure probability to each group of the plurality of groups;
   determining, by the central computer, a failure probability corresponding to a new group of operating values based on the generated model;
   comparing, by the central computer, the failure probability corresponding to the new group of operating values corresponding to the plurality of operating parameters with a predetermined warning threshold value;
   generating, by the central computer, a warning signal in response to the comparison indicating the failure probability corresponding to the new group of operating values exceeds the predetermined warning threshold value; and
   outputting, by the central computer, an operating parameter of the plurality of operating parameters of the new group of operating values that caused the failure probability corresponding to the new group of operating values to exceed the predetermined warning threshold value.

2. The method of claim 1, wherein each operating parameter of the plurality of operating parameters comprises an operating value of a device of the plurality of devices and a detection time of the operating value of the device.

3. The method of claim 1, wherein the failure comprises at least one occurrence of an indication value of at least one indication parameter.

4. The method of claim 1, wherein the generating the model to assign the failure probability further comprises correlating, by the central computer, the plurality of groups with the corresponding failures using a pattern recognition algorithm.

5. The method of claim 1, wherein the generating the warning signal further comprises extrapolating, by the central computer, the new group of operating values corresponding to the plurality of operating parameters to predict new values that cause the failure probability corresponding to the new group of operating values to exceed the predetermined warning threshold value.

6. The method of claim 1, wherein the generating the model to assign the failure probability further comprises evaluating, by the central computer, a plurality of values corresponding to a plurality of external boundary parameters of the radio access network, wherein the plurality of values corresponding to the plurality of external boundary parameters are detected by external sensors within the configurable time interval.

7. A server, comprising:
   at least one processor configured to perform operations comprising:
   receiving a plurality of operating parameters from a plurality of devices of a radio access network via the radio access network;
   checking at a configurable time interval for a failure of the radio access network;
   storing operating values corresponding to the plurality of operating parameters detected within the configurable time interval as a group and the failure of the radio access network detected within the configurable time interval;
   generating a model based on a plurality of groups corresponding to the stored operating values and the stored failure of the radio access network to assign a failure probability to each group of the plurality of groups;
   determining a failure probability corresponding to a new group of operating values based on the generated model;
   comparing the failure probability corresponding to the new group of operating values corresponding to the plurality of operating parameters with a predetermined warning threshold value;
   generating a warning signal in response to the comparison indicating the failure probability corresponding to the new group of operating values exceeds the predetermined warning threshold value; and
   outputting an operating parameter of the plurality of operating parameters of the new group that caused the failure probability corresponding to the new group of operating values to exceed the predetermined warning threshold value.

8. The server of claim 7, wherein each operating parameter of the plurality of operating parameters comprises an operating value of a device of the plurality of devices and a detection time of the operating value of the device.

9. The server of claim 7, wherein the failure of the radio access network comprises at least one occurrence of an indication value of at least one indication parameter.

10. The server of claim 7, wherein the generating the model to assign the failure probability further comprises correlating the plurality of groups with corresponding failures using a pattern recognition algorithm.

11. The server of claim 7, wherein the generating the warning signal further comprises extrapolating the new group of operating values corresponding to the plurality of operating parameters to predict new values that cause the failure probability corresponding to the new group of operating values to exceed the predetermined warning threshold value.

12. The server of claim 7, wherein the generating the model to assign the failure probability further comprises evaluating a plurality of values corresponding to a plurality of external boundary parameters of the radio access network, wherein the plurality of values corresponding to the plurality of external boundary parameters are detected by external sensors within the configurable time interval.

* * * * *